US011475213B2

(12) United States Patent  (10) Patent No.: US 11,475,213 B2
Deleverio et al.  (45) Date of Patent: Oct. 18, 2022

(54) INFORMATION PROCESSING APPARATUS AND IMAGE FORMING APPARATUS THAT ADD MODIFICATION HISTORY TO MODIFIED SOURCE IMAGE, ACCORDING TO MODIFICATION MADE

(71) Applicant: KYOCERA Document Solutions Inc., Osaka (JP)

(72) Inventors: Lianney Deleverio, Osaka (JP); Archie Logarta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/129,024

(22) Filed: Dec. 21, 2020

(65) Prior Publication Data

US 2021/0200938 A1 Jul. 1, 2021

(30) Foreign Application Priority Data

Dec. 27, 2019 (JP) .............................. JP2019-238267

(51) Int. Cl.
   *G06F 17/00* (2019.01)
   *G06F 40/169* (2020.01)
   *G06F 3/12* (2006.01)
   *G06F 40/106* (2020.01)

(52) U.S. Cl.
   CPC .......... *G06F 40/169* (2020.01); *G06F 3/1205* (2013.01); *G06F 3/1231* (2013.01); *G06F 3/1242* (2013.01); *G06F 40/106* (2020.01)

(58) Field of Classification Search
   CPC .... G06F 40/169; G06F 40/106; G06F 3/1205; G06F 3/1231; G06F 3/1242
   See application file for complete search history.

(56) References Cited

U.S. PATENT DOCUMENTS

| 8,819,558 | B2 * | 8/2014 | Hirakawa | G11B 27/34 715/723 |
| 9,530,050 | B1 * | 12/2016 | Erol | G06F 16/583 |
| 2002/0080386 | A1 * | 6/2002 | Snowdon | G06F 40/169 358/1.15 |
| 2004/0179224 | A1 * | 9/2004 | Kidokoro | H04N 1/2187 358/1.14 |
| 2007/0236717 | A1 * | 10/2007 | Nishikawa | G06F 40/197 358/1.13 |
| 2008/0080017 | A1 * | 4/2008 | Ishizuka | G06F 16/258 358/452 |

(Continued)

FOREIGN PATENT DOCUMENTS

JP 2008-084324 A 4/2008
JP 2016-157307 A 9/2016

*Primary Examiner* — Mohammed H Zuberi

(74) *Attorney, Agent, or Firm* — IP Business Solutions, LLC

(57) ABSTRACT

An information processing apparatus includes an image reading device, a control device, and an input device. The image reading device reads a source document and generates image data. The control device acts as a controller that generates an editable electronic file from the image data. The input device is to be used by a user to input an instruction. The controller adds, upon receipt of a modification of the source image represented by the electronic file, through the input device, a modification history based on the modification made, to the modified source image.

2 Claims, 14 Drawing Sheets

(56) References Cited

U.S. PATENT DOCUMENTS

| | | | |
|---|---|---|---|
| 2008/0253683 A1* | 10/2008 | Nakamura | G06K 9/03 |
| | | | 382/276 |
| 2015/0248384 A1* | 9/2015 | Luo | G06F 40/197 |
| | | | 715/229 |
| 2016/0246771 A1 | 8/2016 | Tsuji et al. | |
| 2016/0292295 A1* | 10/2016 | Joseph | G06F 16/2358 |
| 2017/0103066 A1* | 4/2017 | Kisin | H04L 67/06 |
| 2017/0185773 A1* | 6/2017 | Lemay | H04L 63/145 |
| 2017/0286672 A1* | 10/2017 | Sultana | G06F 21/56 |

\* cited by examiner

Requirement Guidelines

The following guidelines have been established by HHS to ensure that MS Word documents meet Section 508 Compliance requirements.

1.0 Document Layout and Formatting 1.1 The document must be formatted using Style elements in a hierarchical manner (i.e. Heading 1, Title, Emphasis, Outline, etc...) because Assistive Technology can better determine the difference between sections. To add Styles, select the text you want to format and then click *Format* from the drop down menu and access *Styles and Formatting*.

1.2 The document can not contain flashing, flickering and/or animated text. Flashing or flickering content can cause seizures and the Assistive Technology cannot decipher the content.

1.3 If page numbers are present, they must be created by MS and not manually entered. When page numbers are added properly a user using Assistive Technology can easily find what page they are currently on. To add page numbers to a document click *Insert* from the drop down menu, then click on *Page Numbers*.

1.4 If footnotes are present, they must be created through Word Footnote tool. Assistive Technology recognizes format footnotes and works them into the body of the text when reading. To create a footnote click on the *Format* from the drop down menu, then click *Reference* and then *Footnote*.

1.5 There must be an alternate method if color was used to emphasize importance of selected text such as Bold or *Italic*. This aids individuals with color blindness.

1.6 The Bullet style must be used as opposed to manually typed characters such as hyphens or dashes. Assistive Technology recognizes these items as lists of information and will navigate them accordingly.

1.7 Track changes need to be accepted or rejected and then turned off. Assistive Technology cannot consistently read them.

1.8 Comments and formatting marks must be turned off. Assistive Technology cannot consistently read them.

1.9 Final visual document checks need to be in the Print Preview. This will show items such as headers, footers, page numbers, and repeating table heading rows. To view a document in Print Preview click on the *View* drop down menu, then click on *Print Layout*.

1.10 All URLs must contain the correct hyperlink and display the fully qualified URL. Assistive Technology recognizes formal hyperlinks and it helps the impaired users to navigate to the linked destination.

1.11 All the URL's must be active and linked to the correct destination. Assistive Technology recognizes formal hyperlinks and it helps the impaired users to navigate to the linked destination.

NUMBER OF EDITION: THIRD EDITION
DATE AND TIME OF MODIFICATION: 2019/08/09 14:03
MODIFIER: JOHN

Fig.9

| NUMBER OF EDITION | DATE AND TIME OF MODIFICATION | MODIFIED PAGE | MODIFIER |
|---|---|---|---|
| SECOND EDITION | 2019/08/10 15:00 | FIRST PAGE | JOHN |

Fig.11

| NUMBER OF EDITION | DATE AND TIME OF MODIFICATION | MODIFIED PAGE | MODIFIER |
|---|---|---|---|
| SECOND EDITION | 2019/08/10 15:00 | FIRST PAGE | JOHN |
| THIRD EDITION | 2019/08/10 15:03 | SECOND PAGE | JOHN |

Fig.12

| NUMBER OF EDITION | DATE AND TIME OF MODIFICATION | DETAILS | MODIFIER |
|---|---|---|---|
| SECOND EDITION | 2019/08/10 15:00 | FIRST PAGE CHANGED: BEGINNING | JOHN |
| THIRD EDITION | 2019/08/10 15:03 | SECOND PAGE DELETED: PROVISIONS 2.3 – 2.7 ADDED: PROVISIONS 3.5 – 3.6 | JOHN |

INFORMATION PROCESSING APPARATUS AND IMAGE FORMING APPARATUS THAT ADD MODIFICATION HISTORY TO MODIFIED SOURCE IMAGE, ACCORDING TO MODIFICATION MADE

INCORPORATION BY REFERENCE

This application claims priority to Japanese Patent Application No. 2019-238267 filed on Dec. 27, 2019, the entire contents of which are incorporated by reference herein.

BACKGROUND

The present disclosure relates to an information processing apparatus and an image forming apparatus, and in particular to a technique to manage a modification history of a source image.

Some techniques have been developed to manage modification of an image represented by an electronic file. For example, when a document represented by a document file retrieved from a database, printed with document index ID information added thereto, is manually modified by a user and scanned, the document file representing the scanned document can be uploaded to the database, as an updated version of the document identified on the basis of the document index ID information.

Another technique includes displaying on a display device, upon receipt of print data, a list of possible modifications generated by a data management server on the basis of the received print data and past print data accumulated thus far, and applying, when the user selects one of the possible modifications, the selected modification to the print data.

SUMMARY

The disclosure proposes further improvement of the foregoing technique.

In an aspect, the disclosure provides an information processing apparatus including an image reading device, a control device, and an input device. The image reading device reads a source document and generates image data. The control device includes a processor, and acts, when the processor executes a control program, as a controller that generates an editable electronic file from the image data. The input device is to be used by a user to input an instruction. The controller adds, upon receipt of a modification of the source image represented by the electronic file, through the input device, a modification history based on the modification made, to the modified source image.

In another aspect, the disclosure provides an image forming apparatus including the foregoing information processing apparatus, and an image forming device. The image forming device forms an image on a recording medium. The controller causes the image forming device to form the modified image to which the modification history has been added.

BRIEF DESCRIPTION OF THE DRAWINGS

FIG. 6 is a schematic drawing showing an example of the source image according to a second edition;

FIG. 7 is a schematic drawing showing an example of the source image according to a third edition;

FIG. 9 is a schematic drawing showing an example of a modification history page;

FIG. 11 is a schematic drawing showing another example of the modification history page; and FIG. 12 is a schematic drawing showing another example of a modification history list.

DETAILED DESCRIPTION

Figure 1:
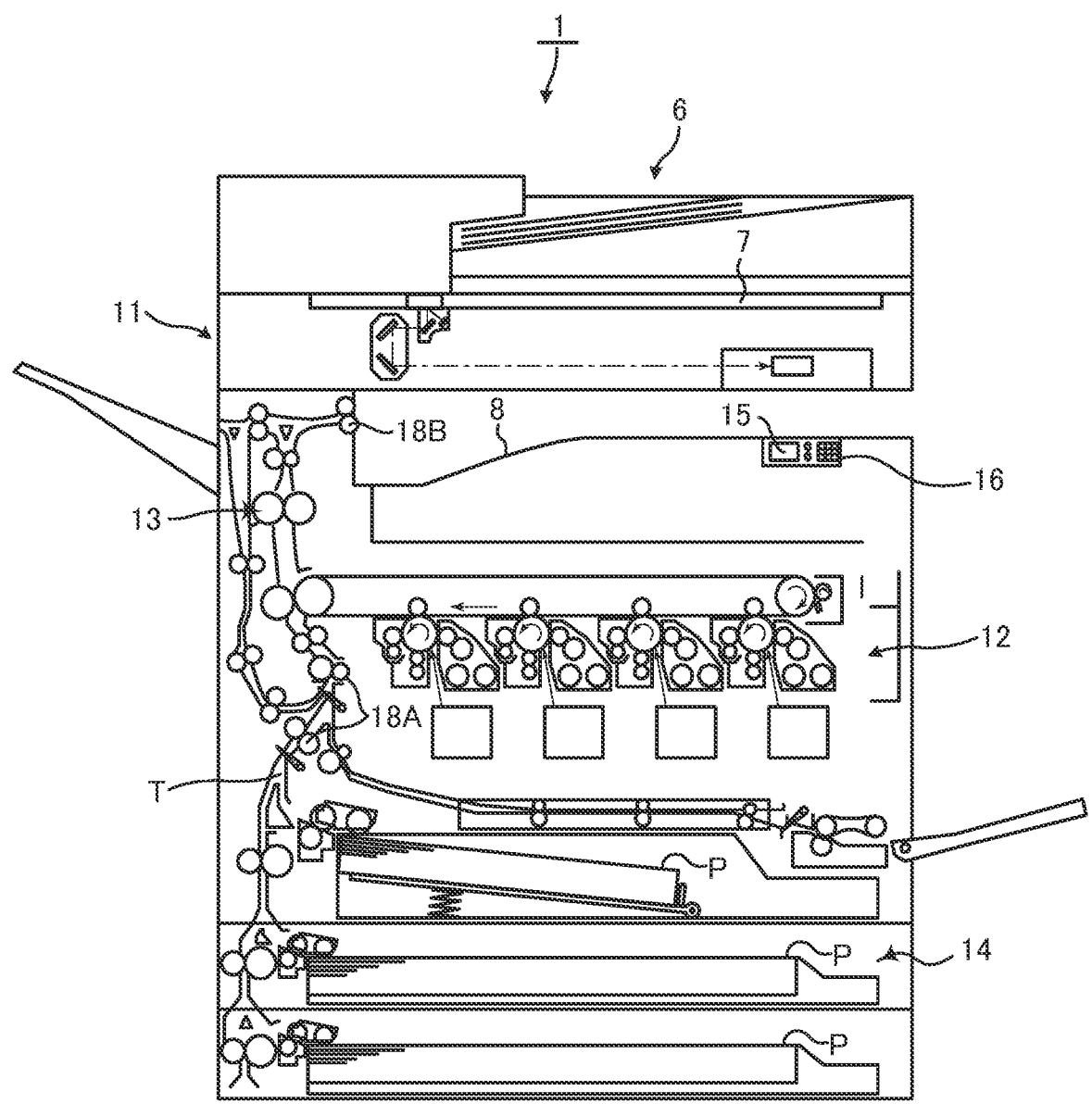
FIG. 1 is a front cross-sectional view showing a structure of an image forming apparatus according to an embodiment of the disclosure.

Hereafter, an image forming apparatus, incorporated with an information processing apparatus according to an embodiment of the disclosure, will be described with reference to the drawings. FIG. 1 is a front cross-sectional view showing a structure of the image forming apparatus according to the embodiment of the disclosure. The image forming apparatus 1 shown in FIG. 1 is a multifunction peripheral having a plurality of functions such as copying, transmission, printing, and facsimile communication. The image forming apparatus 1 is also configured to add a modification history to a source image represented by an electronic file.

Figure 2:
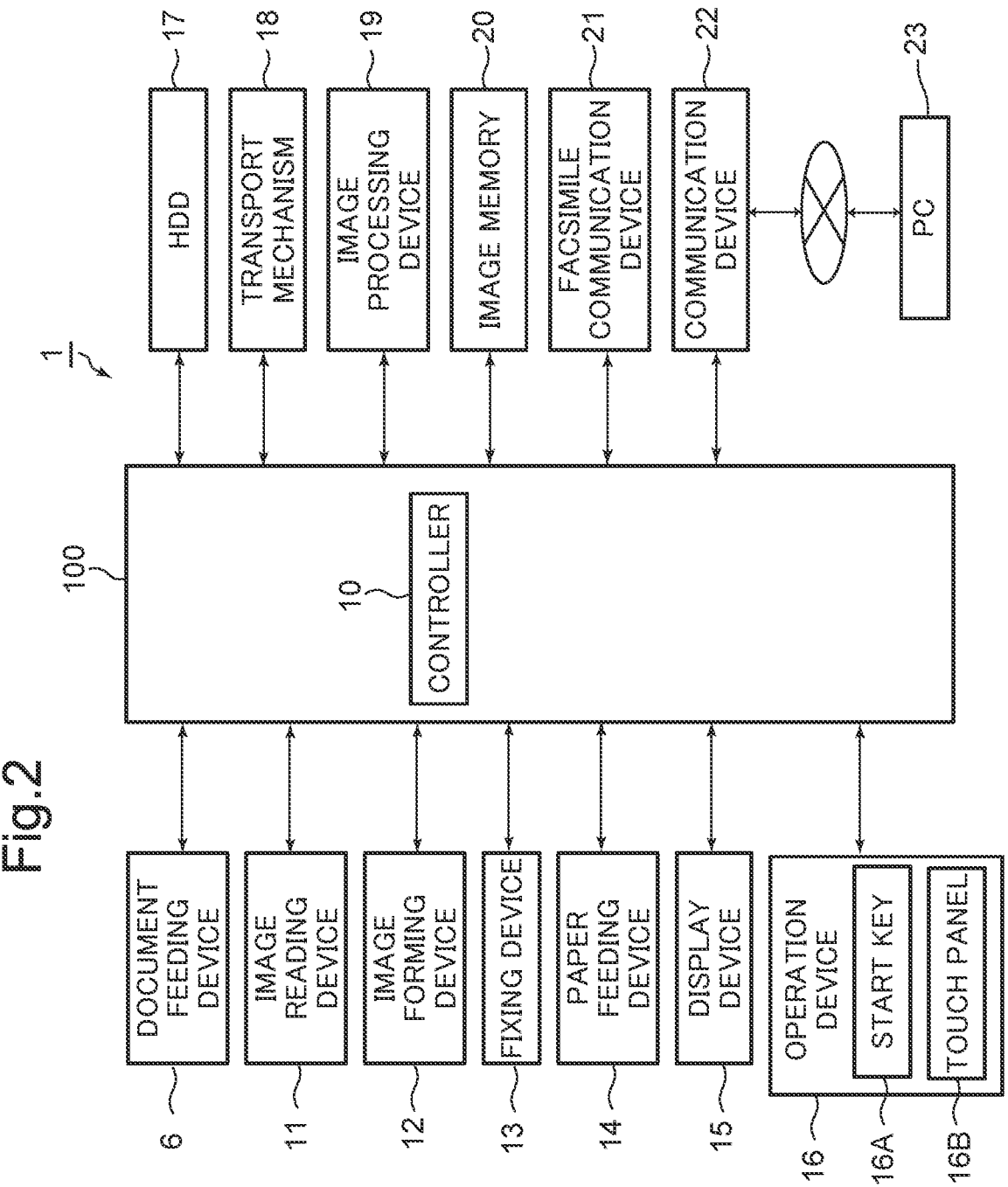
FIG. 2 is a block diagram showing an internal configuration of the image forming apparatus.

FIG. 2 is a block diagram showing an internal configuration of the image forming apparatus. Referring to FIG. 1 and FIG. 2, a plurality of components for realizing the functions of the image forming apparatus 1 are accommodated inside the casing thereof. Specifically, for example, an image reading device 11, an image forming device 12, a fixing device 13, and a paper feed device 14 are provided in the casing.

The image forming apparatus 1 includes a control device 100. The control device 100 includes a processor, a random-access memory (RAM), and a read-only memory (ROM). The processor is, for example, a central processing device (CPU), a micro processing device (MPU), or an application specific integrated circuit (ASIC).

The control device 100 acts as a controller 10, when the processor executes a control program stored in the ROM or hard disk drive (HDD) 17. Here, the controller 10 may be constituted in the form of a hardware circuit, instead of being realized by the operation according to the control program.

The controller 10 controls the overall operation of the image forming apparatus 1. To be more detailed, the controller 10 controls the operation of each of the components of the image forming apparatus 1, and also the communication with, for example, a personal computer (PC) 23 connected via a network. The controller 10 also executes a modification history adding operation for adding a modification history to a source image represented by an electronic file to be subsequently described, by operating according to an addition program.

The control device 100 is electrically connected to the image reading device 11, the image forming device 12, the fixing device 13, the paper feeding device 14, a display device 15, an operation device 16, the HDD 17, a transport mechanism 18, an image processing device 19, an image memory 20, a facsimile communication device 21, and a communication device 22.

The image reading device 11 includes an automatic document feeder (ADF), having a document feeding device 6 that transports a source document placed on a document table, and a scanner that optically reads the source document transported by the document feeding device 6, or placed on a platen glass 7. The image reading device 11 emits light to the source document from a light emitter, and receives the reflected light with a charge-coupled device (CCD) sensor, to thereby read the source document and generate image data.

The image forming device 12 includes a photoconductor drum, a charging device, an exposure device, a developing device, and a transfer device. The image forming device 12 forms a toner image on a recording sheet P delivered from the paper feeding device 14, on the basis of the image data generated by the image reading device 11.

The fixing device 13 heats and presses the recording sheet P on which the toner image has been formed by the image forming unit 12, to thereby fix the toner image on the recording sheet P After the fixing, the recording sheet P having the toner image fixed thereon by the fixing device 13 is discharged to an output tray 8.

The paper feeding device 14 includes a manual bypass tray, a plurality of paper cassettes. The paper feeding device 14 draws out one by one the recording sheets P stored in the paper cassette, or placed on the manual bypass tray, and feeds the recording sheets P to the image forming device 12.

The display device 15 is constituted of, for example, an LCD or an organic light-emitting diode (OLED) display. The display device 15 displays, under the control of the controller 10, various types of screens related to the functions that the image forming apparatus 1 is configured to perform.

The operation device 16 includes a plurality of hard keys, such as a start key 16A, for instructing the start of various operations. The operation device 16 also includes a touch panel 16B overlaid on the display device 15. The user inputs various types of information, such as the instruction related to the functions that the image forming apparatus 1 is configured to perform, through the operation device 16. The operation device 16 exemplifies the input device in the disclosure.

The HDD 17 is a large-capacity storage device for storing various types of data, including the electronic files generated by the image reading device 11 and the controller 10. The HDD 17 contains various control programs to be used to realize basic operations of the image forming apparatus 1. One of the control programs stored in the HDD 17 is the addition program for performing the modification history adding operation, according to the embodiment of the disclosure.

The HDD 17 contains, as another control program, an OCR program for executing the known optical character recognition (OCR). The controller 10 recognizes the characters contained in the source image represented by the electronic file, by operating according to the OCR program.

In the HDD 17, user names for identifying the user and the respective passwords are stored in advance in association with each other, as authentication information. The user can register the authentication information in advance, through the operation device 16. In this embodiment, the user name "JOHN" and the password "0123" are stored in advance in the HDD 17 in association with each other, as the authentication information.

The controller 10 permits the user to utilize the image forming apparatus 1, provided that the log-in user name and the log-in password, inputted through the operation device 16, accord with the authentication information. When the log-in user name and the log-in password disaccord with the authentication information, the controller does not permit the use of the image forming apparatus 1.

The transport mechanism 18 includes a transport roller pair 18A and a discharge roller pair 18B. The transport mechanism 18 serves to transport the recording sheet P along a transport route T, toward the output tray 8 designated as the discharge destination.

The image processing device 19 performs, if need be, image processing with respect to the image data generated by the image reading device 11. The image memory 20 includes a region for temporarily storing the image data generated by the image reading device 11. The facsimile communication device 21 makes connection to the public telephone network, to transmit and receive the image data through the public telephone network.

The communication device 22 includes a communication module such as a local area network (LAN) board. The image forming apparatus 1 performs data communication through the communication device 23, with the PC 23 connected via a network.

A power source is provided for each of the components in the image forming apparatus 1, so that the components of the image forming apparatus 1 may perform the operation, with the power from the power source.

[Operation]

Figure 3A:
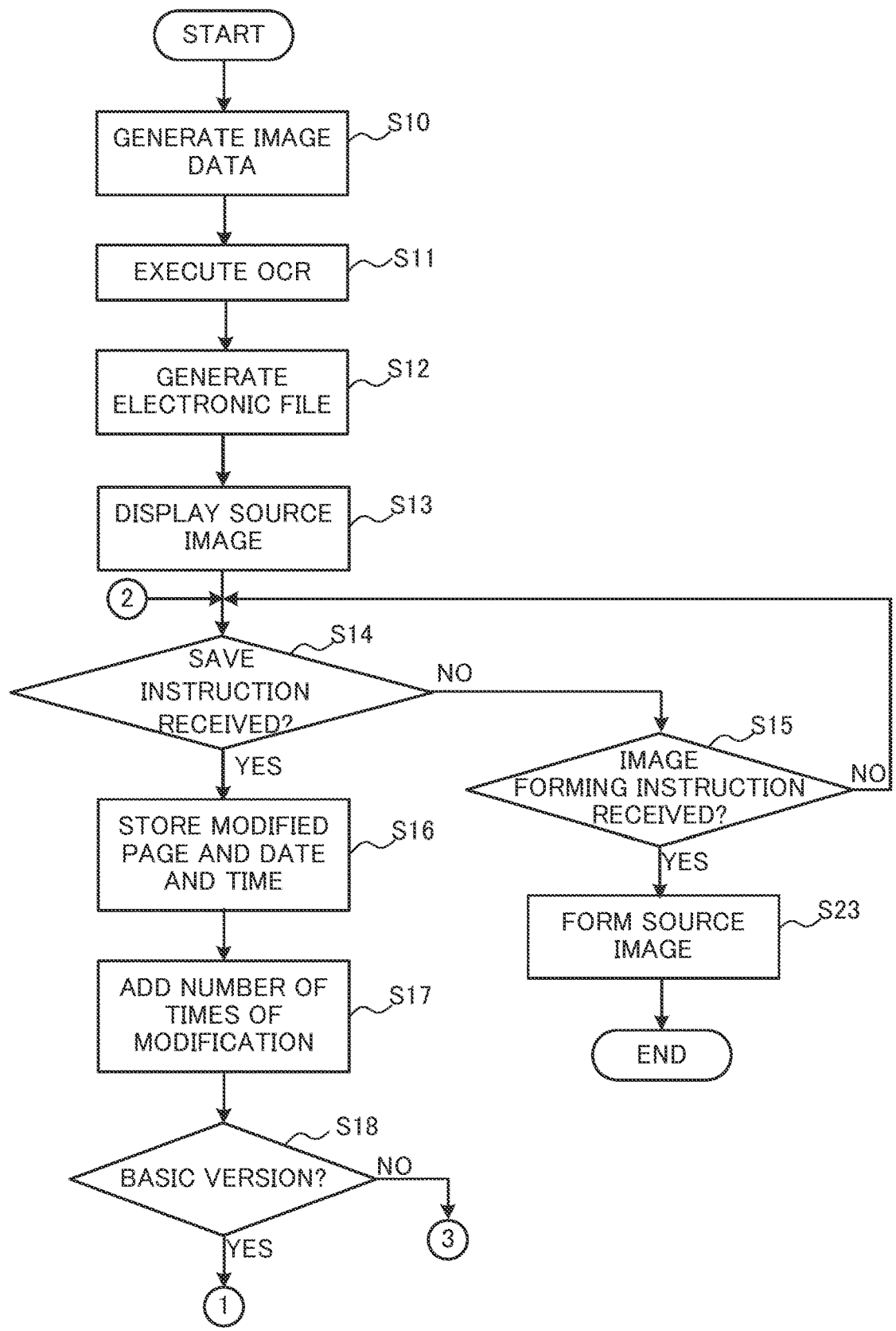
FIG. 3A is a flowchart showing a modification history adding operation.
Figure 3B:
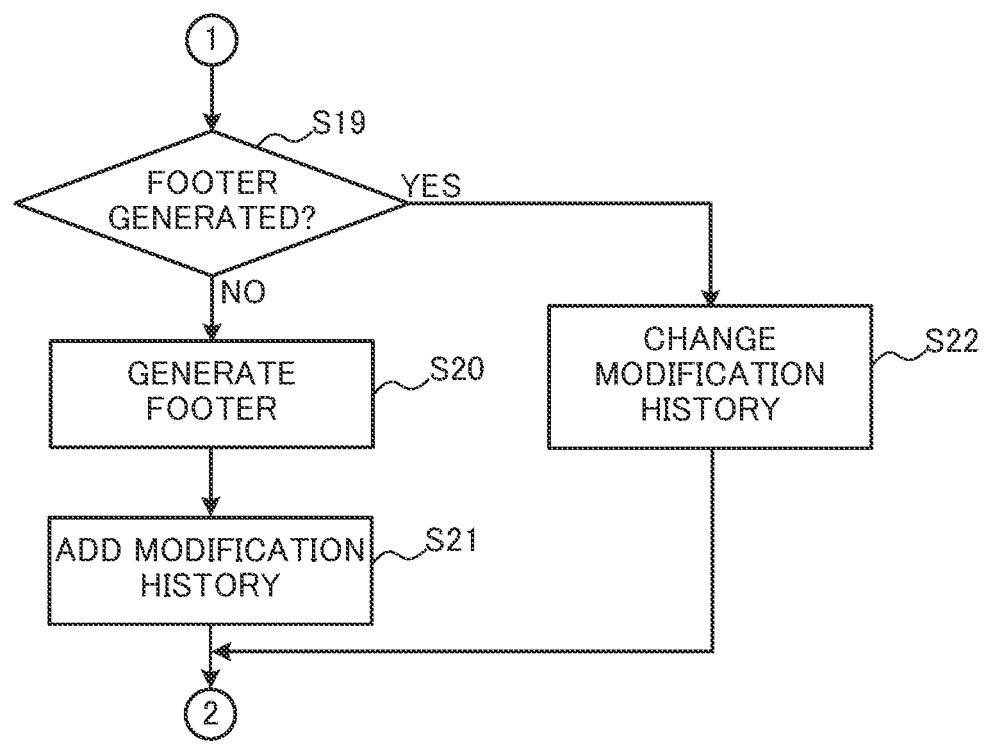
FIG. 3B is a flowchart showing a modification history adding operation, subsequent to the process of FIG. 3A.
Figure 3C:
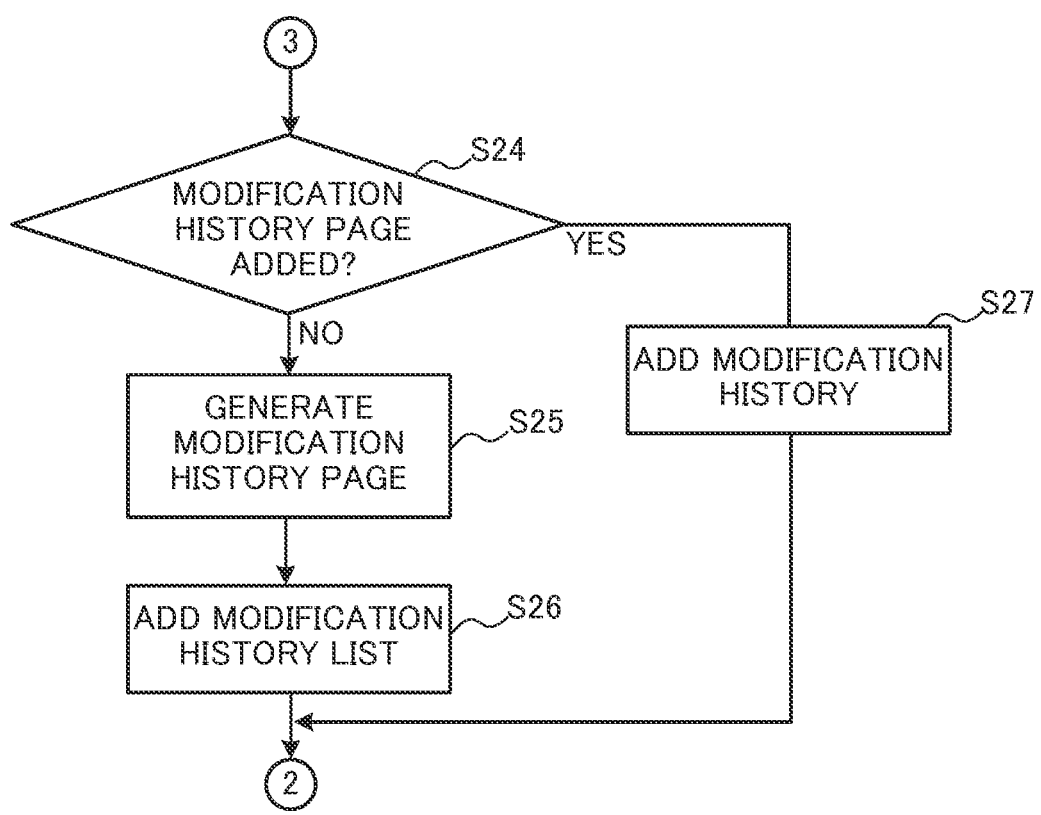
FIG. 3C is another flowchart showing a modification history adding operation, subsequent to the process of FIG. 3A.
Figure 4:
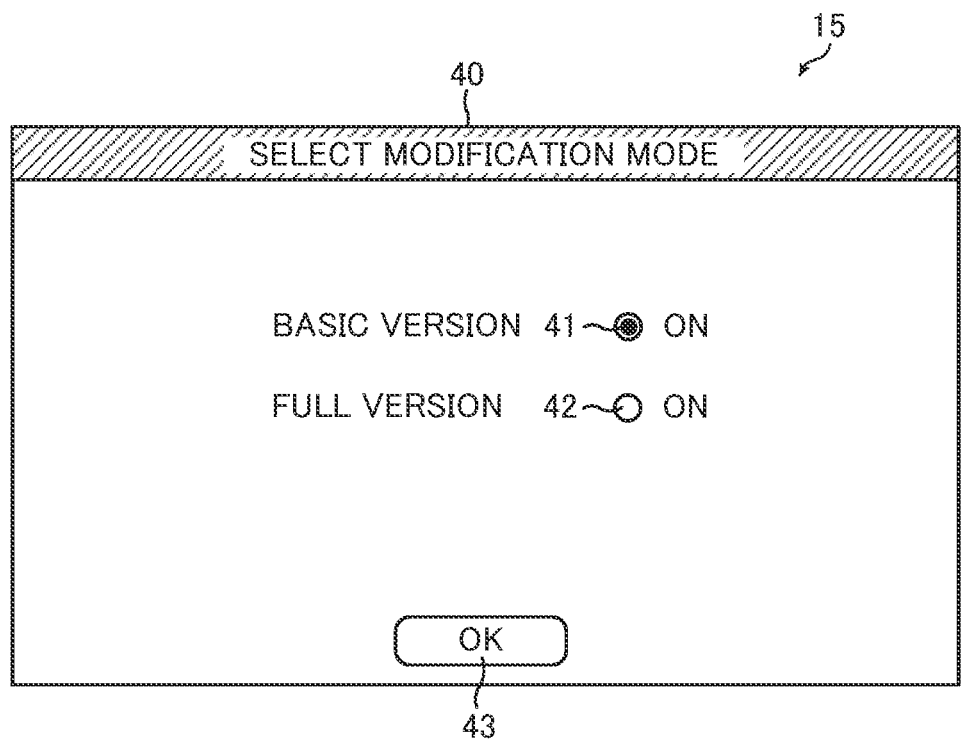
FIG. 4 is a schematic drawing showing an example of a setup screen.
Figure 5:
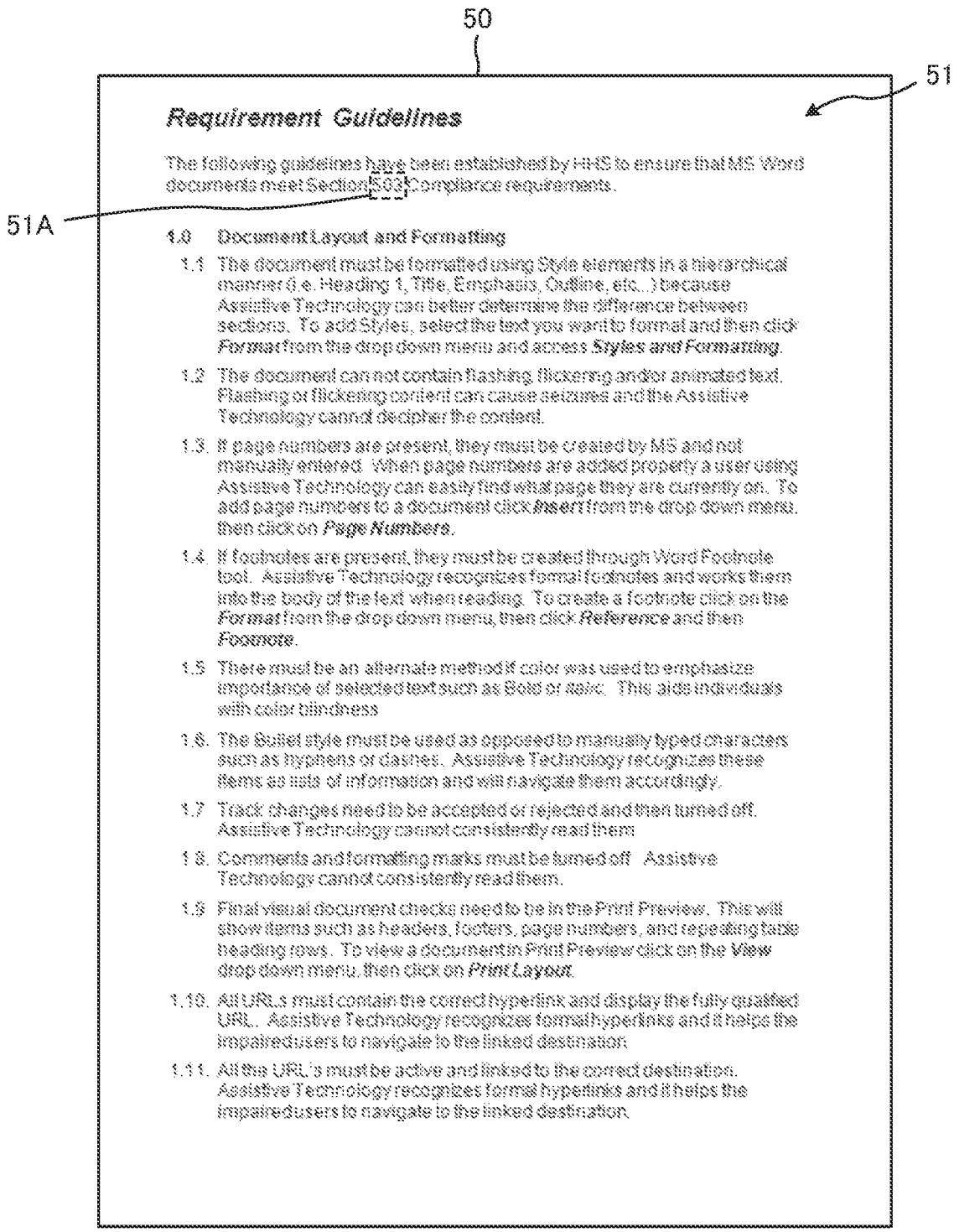
FIG. 5 is a schematic drawing showing an example of a source image according to the original edition.
Figure 6:
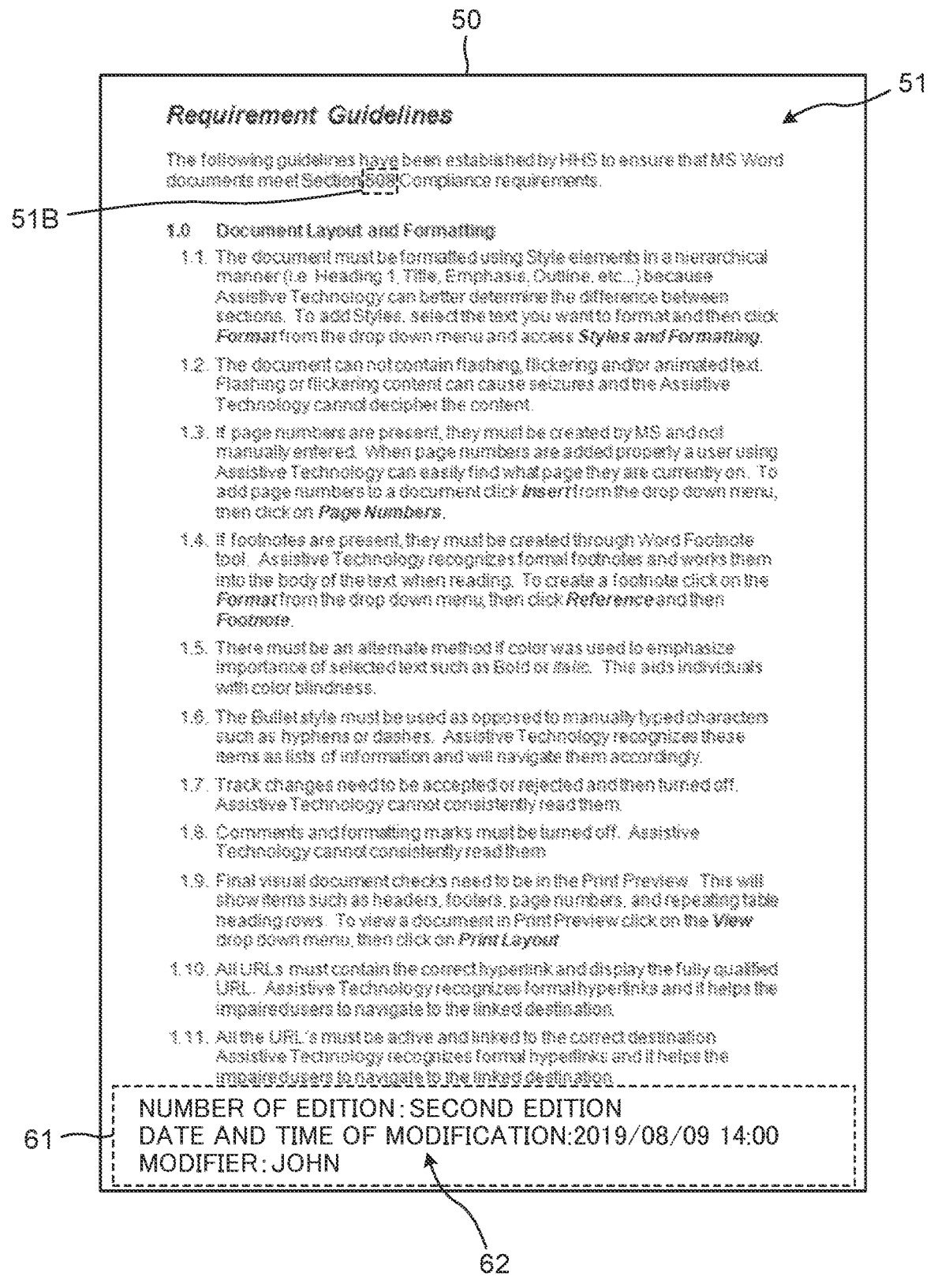
Figure 8:
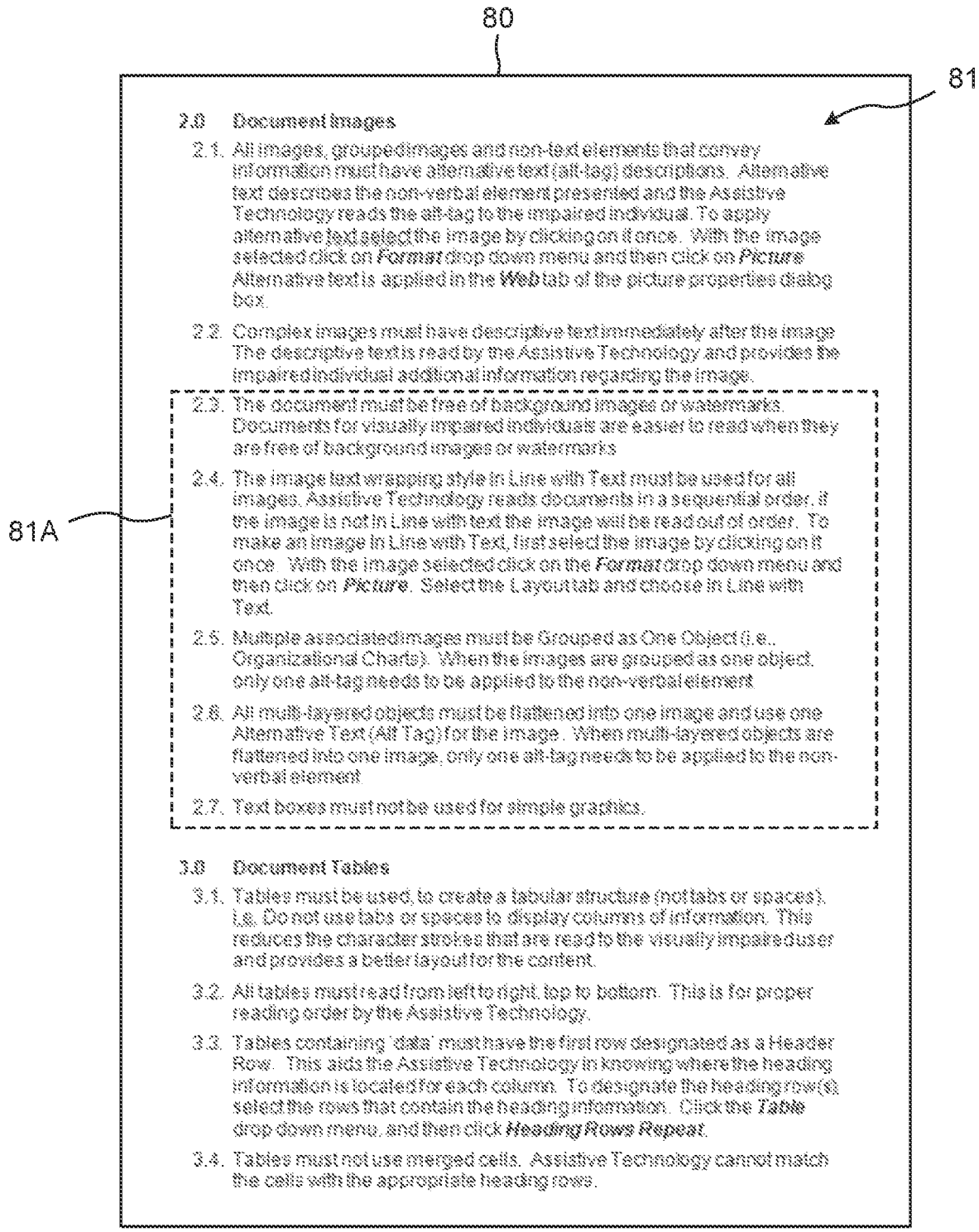
FIG. 8 is a schematic drawing showing a part of another example of the source image according to the original edition.
Figure 9:
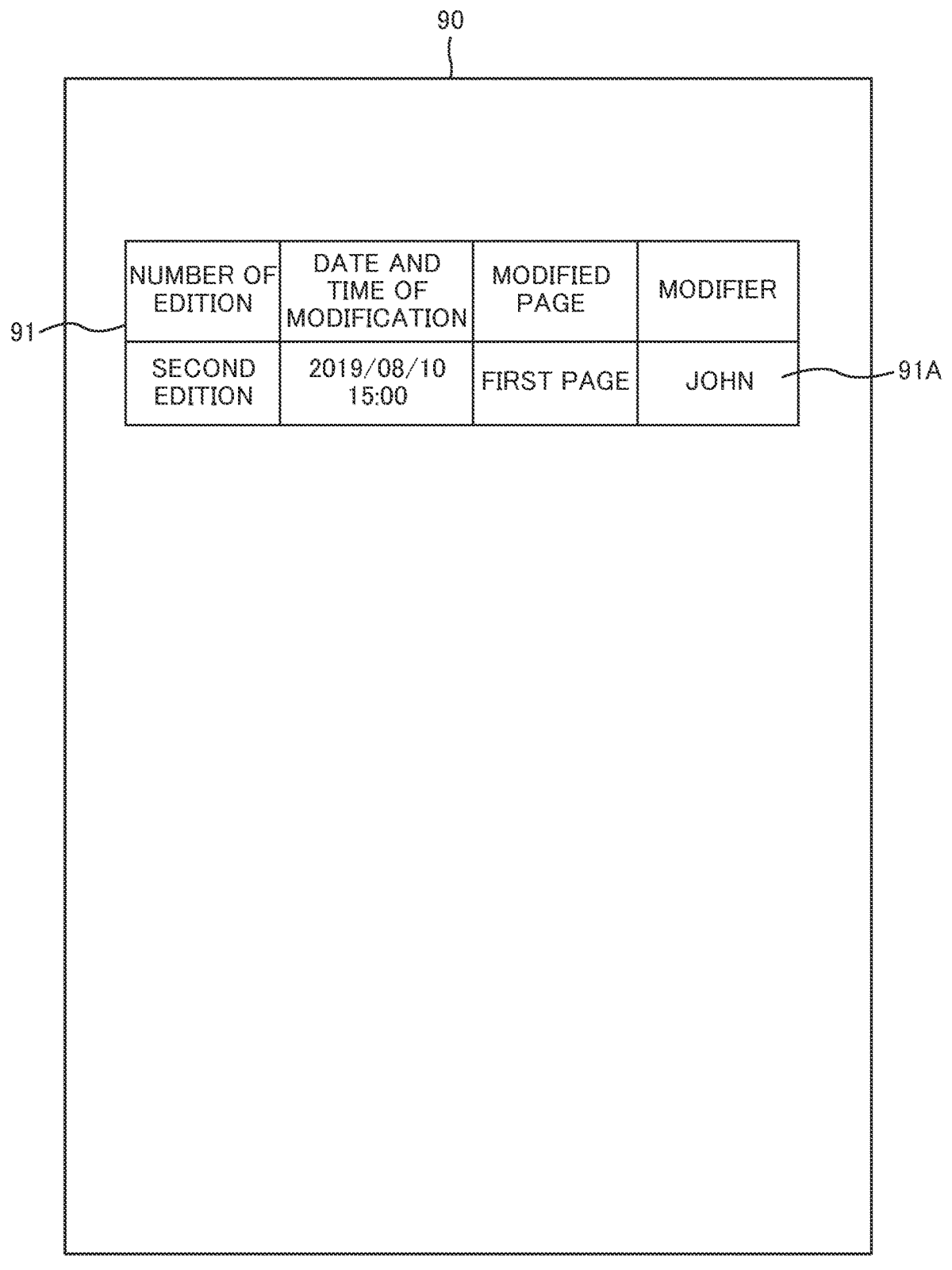
Figure 10:
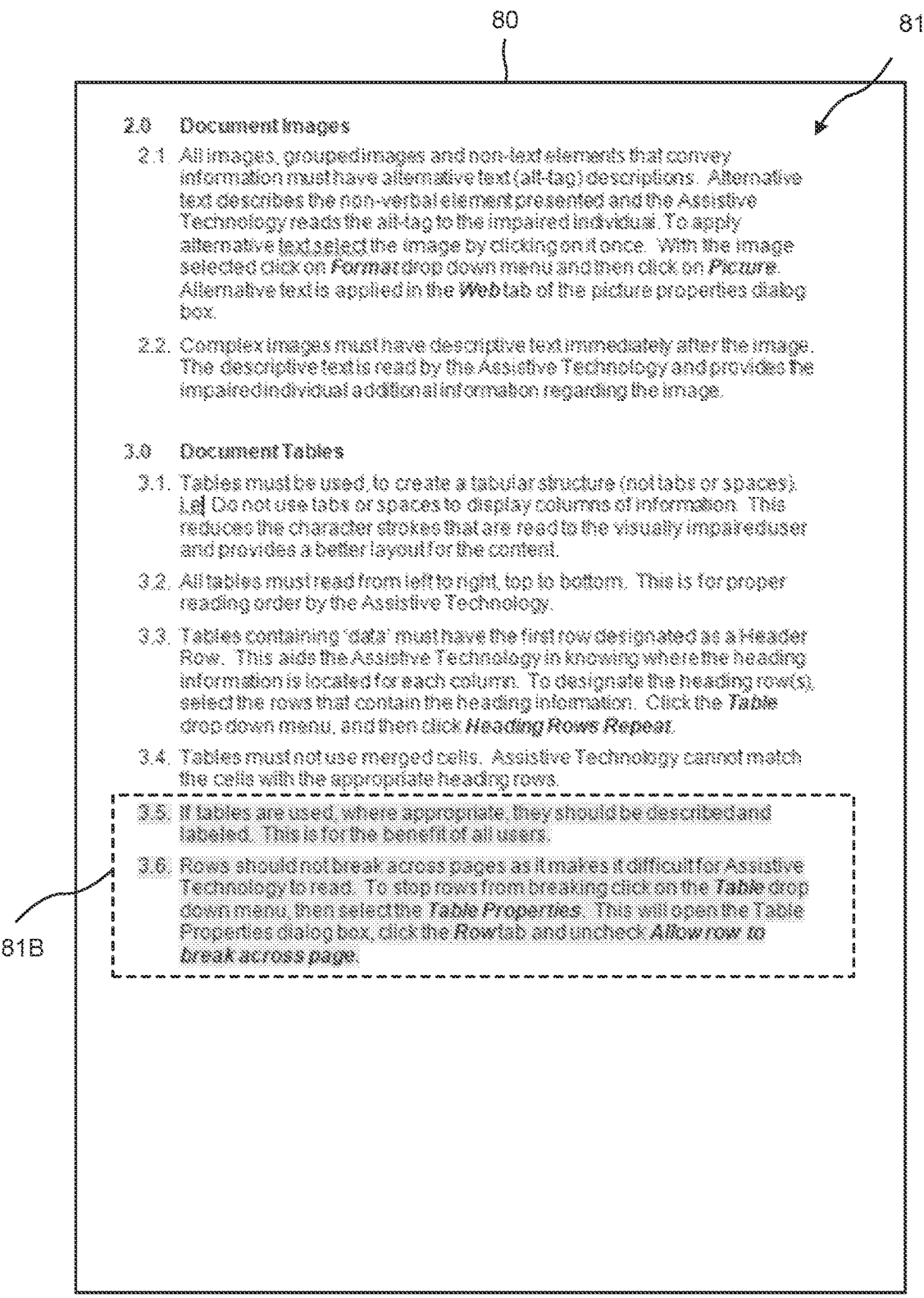
FIG. 10 is a schematic drawing showing a part of another example of the source image according to the third edition.

FIG. 3A to FIG. 3C are flowcharts each showing a modification history adding operation. FIG. 4 is a schematic drawing showing an example of a setup screen. FIG. 5 is a schematic drawing showing an example of a source image according to the original edition. FIG. 6 is a schematic drawing showing an example of the source image according to a second edition. FIG. 7 is a schematic drawing showing an example of the source image according to a third edition. FIG. 8 is a schematic drawing showing a part of another example of the source image according to the original edition. FIG. 9 is a schematic drawing showing an example of a modification history page. FIG. 10 is a schematic drawing showing a part of another example of the source image according to the third edition. FIG. 11 is a schematic drawing showing another example of the modification history page. Hereunder, the operation of the image forming apparatus 1 will be described, with reference to FIG. 3A to FIG. 11.

When the user turns on the power to the image forming apparatus 1, the controller 10 causes the display device 15 to display the authentication screen, for the user to input the log-in user name and the log-in password. In view of the authentication screen, the user inputs an authentication request, by inputting the log-in user name "JOHN" and the log-in password "0123", through the touch panel 16B.

Upon receipt of the authentication request through the touch panel 16B, the controller 10 decides whether the log-in user name and the log-in password inputted as above accord with the authentication information stored in advance in the HDD 17. Upon deciding that the log-in user name and the log-in password accord with the authentication information, the controller 10 causes the display device 15 to display a home screen for selecting one of the plurality of functions that the image forming apparatus 1 is configured to perform.

It is assumed here that, in view of the home screen, the user inputs an instruction to select a modification history adding function, through the touch panel 16B. Upon receipt of the selection instruction inputted as above through the touch panel 16B, the controller 10 causes the display device 15 to display a setup screen 40 for selecting the mode of the modification history adding function, as shown in FIG. 4.

The controller 10 displays a radio button 41 for selecting "basic version", and a radio button 42 for selecting "full version", on the setup screen 40. The "basic version" refers to adding the modification history to the page constituting the source image. The "full version" refers to adding the modification history to a page different from the page constituting the source image.

(1) When Basic Version is Selected

It is assumed here that the user has touched the radio button 41, in view of the setup screen 40. Upon detecting through the touch panel 16B that the radio button 41 has been touched, the controller 10 displays a check mark on the radio button 41.

After touching the radio button 41, the user touches a soft key 43, to confirm the selection. Upon detecting through the touch panel 16B that the soft key 43 has been touched, the controller 10 stores the selected modification mode "basic version" indicated on the setup screen 40, in the HDD 17. At the same time, the controller 10 also stores a value "0" in the HDD 17, as the number of times of modification with respect to the source image.

After touching the soft key 43, the user places a source document on the platen glass 7 of the image reading device 11, and presses the start key 16A. Referring to FIG. 3A, upon detecting that the start key 16A has been pressed, the controller 10 starts the modification history adding operation, and causes the image reading device 11 to read the source document placed on the platen glass 7, and to generate image data (step S10).

After step S10, the controller 10 performs the OCR with respect to the image data generated, thereby recognizing the characters contained in the source document (step S11). After step S11, the controller 10 generates an electronic file on which the characters can be edited on the basis of the result obtained through the OCR, from the image data generated by the image reading device 11 (step S12). In this embodiment, the controller 10 the electronic file of the portable document format (PDF), at step S12.

After step S12, the controller 10 causes the display device 15 to display a source image 50 represented by the electronic file generated as above, as shown in FIG. 5 (step S13). The source image in which no modification has been made yet will hereafter be referred to as "original edition". In this embodiment, the original edition of the source image 50 is constituted of a single page, and includes a character string 51 that can be edited. After step S13, the controller 10 stands by for a save instruction to save a modification made on the source image 50, or for an image forming instruction.

During the stand-by period, the controller 10 is repeating the decision that the save instruction has not been received (NO at step S14), and that the image forming instruction has not been received (NO at step S15). It is assumed here that, under such situation, the user modifies a character string 51A written as "503" in the character string 51, to "508", which will be referred to as a character string 51B, as shown in FIG. 6, by inputting through the touch panel 16B, and inputs the save instruction to save such modification.

Upon receipt of the save instruction through the touch panel 16B (YES at step S14), the controller 10 stores the modified page containing the modified character string, and the date and time of the modification, in the HDD 17 (step S16). More specifically, the controller 10 stores information indicating "first page" in the HDD 17, as the modified page. The controller 10 also stores information indicating "2019/08/09 14:00", which is the date and time that the save instruction was received, in the HDD 17 as the date and time of the modification.

After step S16, the controller 10 adds 1 to the value indicating the number of times of modification stored in the HDD 17 (step S17). At this point, the value indicating the number of times of modification stored in the HDD 17 becomes "1". After step S17, the controller 10 decides whether the modification mode stored in the HDD 17 is the "basic version" (step S18).

In this embodiment, the controller 10 decides that the "basic version" is stored in the HDD 17 (YES at step S18), and decides whether a predetermined region, hereinafter referred to as a footer, for adding the modification history is prepared in the page constituting the source image 50, as shown in FIG. 3B (step S19).

(1-1) When Footer is not Prepared

The controller 10 decides that the footer is not prepared in the page constituting the source image 50 (NO at step S19), and generates a footer 61 on the last page of the source image 50 (step S20). Since the source image 50 is constituted of a single page in this example, the controller 10 generates the footer 61 on the first page of the source image 50, as shown in FIG. 6.

After step S20, the controller 10 generates a modification history 62 indicating the number of edition, the date and time of the modification, and the modifier, and includes the modification history 62 in the footer 61 (step S21). More specifically, the controller 10 generates the modification history 62 including a character string "second edition" indicating the number of edition, a character string "2019/08/09 14:00" indicating the date and time of the modification, and a character string "JOHN" indicating the modifier. Here, the "second edition" refers to a source image that has been modified once.

The controller 10 generates the character string indicating the number of edition according to the number of times of modification stored in the HDD 17, and the character string indicating the date and time of the modification, according to the date and time of the modification stored in the HDD 17. The controller 10 also generates the character string indicating the modifier, according to the log-in user name. After step S21, the controller 10 returns to the operation of step S14. At this point, the controller 10 causes the display device 15 to display the second edition of the source image 50 shown in FIG. 6.

(1-2) When Footer is Prepared

It is assumed here that, under the mentioned situation, the user has further modified, through the touch panel 16B, the character string 51B "508" contained in the character string 51 to "509", which will be referred to as a character string 51C, as shown in FIG. 7, and inputted the save instruction. Upon receipt of the save instruction through the touch panel 16B (YES at step S14), the controller 10 performs the operation of step S16 as above.

In this case, the controller 10 stores the information indicating "first page" in the HDD 17, as the modified page. The controller 10 also stores the information indicating "2019/08/09 14:03" at which the save instruction was received, in the HDD 17 as the date and time of the modification. After step S16, the controller 10 performs the operation of step S17 as above. At this point, the value indicating the number of times of modification stored in the HDD 17 becomes "2".

After step S17, the controller 10 decides that the modification mode stored in the HDD 17 is the "basic version" (YES at step S18), and that the footer 61 is prepared on the page constituting the source image 50 (YES at step S19). Then the controller 10 generates a modification history 72 according to the additional modification as shown in FIG. 7, and updates the modification history 62 included in the footer 61, to the modification history 72 generated as above (step S22).

More specifically, the controller 10 generates the modification history 72 including a character string "third edition" indicating the number of edition, a character string "2019/08/09 14:03" indicating the date and time of the modification, and a character string "JOHN" indicating the modifier. Here, the "third edition" refers to the source image that has been modified twice. After step S22, the controller 10 returns to the operation of step S14. At this point, the controller 10 causes the display device 15 to display the third edition of the source image 50, as shown in FIG. 7.

It is assumed that the user has inputted the image forming instruction, through the touch panel 16B. Upon receipt of the image forming instruction through the touch panel 16B (YES at step 15), the controller 10 causes the image forming device 12 to form the third edition of the source image 50 represented by the modified electronic file, on the recording sheet (step S23). After step S23, the controller 10 finishes the modification history adding operation.

(2) When Full Version is Selected

Here, it is assumed that the user has touched the radio button 42, in view of the setup screen 40. Upon detecting through the touch panel 16B that the radio button 42 has been touched, the controller 10 displays a check mark on the radio button 42. After touching the radio button 42, the user touches the soft key 43.

Upon detecting through the touch panel 16B that the soft key 43 has been touched, the controller 10 stores the "full version" shown on the setup screen 40 in the HDD 17, as the modification mode. At the same time, the controller 10 stores a value "0" in the HDD 17, as the number of times of modification with respect to the source image. After touching the soft key 43, the user places a source document on the platen glass 7 of the image reading device 11, and presses the start key 16A.

Upon detecting that the start key 16A has been pressed, the controller 10 performs the operation of step S10 to step S13, as described above. In this example, it is assumed that the original edition of the source image represented by the electronic file is composed of two pages. The first page of the original edition of the source image contains the source image 50 shown in FIG. 5, and the second page contains a source image 80 shown in FIG. 8. The controller 10 causes the display device 15, at step S13, to display the source image 50 of the first page and the source image 80 of the second page, such that these pages can be switched according to the instruction of the user inputted through the touch panel 16B.

After step S13, the controller 10 is repeating the decision that the save instruction has not been received (NO at step S14), and that the image forming instruction has not been received (NO at step S15). It is assumed here that, under such situation, the user modifies the character string 51A "503" in the character string 51 in the source image 50 corresponding to the first page, to the character string 51B "508" through the touch panel 16B, and inputs the save instruction to save such modification.

Upon receipt of the save instruction through the touch panel 16B (YES at step S14), the controller 10 performs the operation of step S16 as above. More specifically, the controller 10 stores the information indicating "first page" in the HDD 17, as the modified page. The controller 10 also stores the information indicating "2019/08/10 15:00", which is the date and time that the save instruction was received, in the HDD 17 as the date and time of the modification.

After step S16, the controller 10 performs the operation of step S17 as above. At this point, the value indicating the number of times of modification stored in the HDD 17 becomes "1". After step S17, the controller 10 decides that the modification mode stored in the HDD 17 is not the "basic version" (NO at step S18), and decides whether a page for specifying the modification history (hereinafter, "modification history page") is added to the source image, as shown in FIG. 3C (step S24).

(2-1) When Modification History Page is not Added

In this case, the controller 10 decides that the modification history page is not yet added to the source image (NO at step S24), and generates a new page as the modification history page 90, as shown in FIG. 9 (step S25). In this process, the controller 10 generates the modification history page 90 as the page subsequent to the last page of the source image. Since the source image is composed of two pages in this example, the controller 10 generates the modification history page 90 as the third page of the source image.

After step S25, the controller 10 generates a modification history list 91, and includes the modification history list 91 in the modification history page 90 (step S26). More specifically, the controller 10 generates the modification history list 91 including a first column and a second column, the first column including the number of edition, the date and time of the modification, the modified page, and the modifier as the items of the list, and the second column representing a modification history 91A including the character string "second edition", the character string "2019/08/10 15:00", the character string "first page", and the character string "JOHN", respectively corresponding to the items of the first column.

The controller 10 generates the character string indicating the modified page, according to the information indicating the modified page stored in the HDD 17. After step S26, the controller 10 returns to the operation of step S14. At this point, the controller 10 causes the display device 15 to display the second edition of the source image 50 as the first page, the second edition of the source image 80 as the second page, and the modification history page 90 shown in FIG. 9 as the third page, such that these pages can be switched according to the instruction of the user inputted through the touch panel 16B.

(2-2) When Modification History Page has been Added

Here, it is assumed that, under the mentioned situation, the user has deleted a character string 81A indicating provisions 2.3 to 2.7, contained in the character string 81 on the source image 80 corresponding to the second page, through the touch panel 16B, adding at the same time a character string 81B indicating provisions 3.5 and 3.6 as shown in FIG. 10, and has inputted the save instruction to save the mentioned modification.

Upon receipt of the save instruction through the touch panel 16B (YES at step S14), the controller 10 performs the operation of step S16 as above. More specifically, the controller 10 stores the information indicating "second page" in the HDD 17, as the modified page. The controller 10 also stores the information indicating "2019/08/10 15:03", which is the date and time that the save instruction was received, in the HDD 17 as the date and time of the modification.

After step S16, the controller 10 performs the operation of step S17 as above. At this point, the value indicating the number of times of modification stored in the HDD 17 becomes "2". After step S17, the controller 10 decides that the modification mode stored in the HDD 17 is not the "basic version" (NO at step S18), and that the modification history page 90 is added to the source image (YES at step S24). The controller 10 then generates a modification history 91B based on the mentioned additional modification as shown in FIG. 11, and adds the modification history 91B to the position subsequent to the modification history 91A, in the modification history list 91 (step S27).

More specifically, the controller 10 adds a third column to the position subsequent to the second column, the third column representing the modification history 91B including the character string "third edition", the character string "2019/08/10 15:03", the character string "second page", and the character string "JOHN", respectively corresponding to the items of the first column. After step S27, the controller 10 returns to the operation of step S14. At this point, the controller 10 causes the display device 15 to display the third edition of the source image 50 as the first page, the third edition of the source image 80 as the second page, and the modification history page 90 shown in FIG. 11 as the third page, such that these pages can be switched according to the instruction of the user inputted through the touch panel 16B.

It is assumed that the user has inputted the image forming instruction, through the touch panel 16B. Upon receipt of the image forming instruction through the touch panel 16B (YES at step 15), the controller 10 causes the image forming device 12 to sequentially form the third editions of the source image 50 and the source image 80 represented by the modified electronic file, respectively on the first page and the second page of the recording sheet, and also the image of the modification history page 90 shown in FIG. 11, on the third page of the recording sheet (step S23). After step S23, the controller 10 finishes the modification history adding operation.

When the image forming instruction is received from the user through the touch panel 16B, without the source image 50 having been modified by the user (YES at step 15), the controller 10 causes the image forming device 12 to form the original edition of the source image represented by the unmodified electronic file, on the recording sheet (step S23).

Now, with the known techniques described earlier, the user has to look up past electronic files accumulated in a database or a data management server, to confirm the modification history, which is time-taking and troublesome.

With the arrangement according to this embodiment, in contrast, when the controller 10 receives the save instruction to save the modification made to the source image, through the operation device 16, the controller 10 adds the modification history based on the modification made, to the source image itself that has been modified. Since the modification history is thus added to the source image itself that has been modified, the user can easily confirm the modification history, simply by reviewing the modified source image. Therefore, the user can be exempted from the trouble such as looking up the past electronic files, when confirming the modification history.

According to the foregoing embodiment, the controller 10 generates the footer 61 on the page constituting the source image, and includes the modification history 62 based on the modification made in the footer 61, in the case where the "basic version" is designated as the mode of modification, through the touch panel 16B. Further, upon receipt of the save instruction to save an additional modification of the source image, through the touch panel 16B, the controller 10 updates the modification history 62 included in the footer 61 to the modification history 72 reflecting the additional modification.

Therefore, the user can confirm the latest modification history, in view of the footer 61 generated on the source image, which leads to improved user-friendliness of the apparatus.

According to the foregoing embodiment, in the case where the "full version" is designated as the mode of modification through the touch panel 16B, the controller 10 generates the modification history page 90, and includes the modification history list 91 containing the modification history 91A based on the modification made, in the modification history page 90 generated. In addition, when the save instruction to save an additional modification of the source image is received through the touch panel 16B, the controller 10 adds the modification history 91B based on the additional modification, to the modification history list 91.

The mentioned arrangement enables to user to trace the history of the modification thus far made, in view of the modification history page 90 generated as above, thereby further improving the user-friendliness of the apparatus.

According to the foregoing embodiment, the controller 10 causes the display device 15 to display the source image, upon generating the electronic file. Such an arrangement enables the user to input the modification of the source image through the touch panel 16B, while viewing the source image displayed, which leads to further improvement in user-friendliness of the apparatus.

According to the foregoing embodiment, further, the controller 10 causes the image forming device 12 to form the third edition of the source image, to which the modification history is added. Therefore, the user can easily confirm the modification history, in view of the source image formed on the recording sheet.

According to the foregoing embodiment, further, the controller 10 adds the modification history 62, 72 indicating the number of edition, the date and time of the modification, and the modifier, or the modification history 91A, 91B indicating the number of edition, the date and time of the modification, the modified page, and the modifier, to the source image. Therefore, the user can easily confirm the details of the modification history, in view of the source image, which leads to further improvement in user-friendliness of the apparatus.

Other Variations

Although the controller 10 is not configured to emphasize the modified character strings 51B and 51C in the foregoing embodiment, the disclosure is not limited to such an embodiment. For example, the controller 10 may highlight, or display in bold letters, the character strings 51B and 51C, thereby emphasizing the modified character strings.

Although the source image is composed of a single page or two pages in the foregoing embodiment, the disclosure is not limited to such an embodiment. For example, the source image may be composed of three pages. In this case, the controller 10 generates the footer 61 on the third page of the source image at step S20, and generates the modification history page 90 on the fourth page of the source image at step S25.

Although the controller 10 generates the modification history page 90 as a page subsequent to the last page of the source image at step S25 in the foregoing embodiment, a different arrangement may be adopted in the disclosure. For example, the controller 10 may insert the modification history page 90 at the head of the source image, thus to make the modification history page 90 the first page.

Although the controller 10 generates the predetermined region for adding the modification history, namely the footer 61, on the source image in the foregoing embodiment, a different arrangement may be adopted in the disclosure. For example, the controller 10 may generate a header on the source image, as the predetermined region.

Although the controller 10 generates the footer 61 on the last page of the source image 50 in the foregoing embodiment, a different arrangement may be adopted in the disclosure. For example, the controller 10 may generate the footer 61 on the first page of the source image 50, or on all the pages of the source image 50.

In the foregoing embodiment, the modification histories 62 and 72 each include the number of edition, the date and time of the modification, and the modifier, and the modification histories 91A and 91B include the number of edition, the date and time of the modification, the modified page, and the modifier. However, the disclosure is not limited to such a configuration. It suffices that the modification history includes at least one of the number of edition, the date of the modification, and the modifier. For example, the modification history may only include the number of edition and the date of the modification.

In the foregoing embodiment, the controller 10 generates the modification history list 91 including the number of edition, the date and time of the modification, the modified page, and the modifier, as the items of the list. However, the disclosure is not limited to such a configuration. FIG. 12 is a schematic drawing showing another example of the modification history list. The controller 10 may generate, as the example shown in FIG. 12, a modification history list 121 including the number of edition, the date and time of the modification, the modified page, the details of the modification made, and the modifier, as the items of the list. Here, the controller 10 specifies in advance the items of the modification history list, according to the instruction of the user inputted through the operation device 16.

The controller 10 may add, to the second column of the modification history list 121, a modification history 121A including the character string "first page" indicating the modified page, and a character string "Changed: Beginning" indicating that the character string at the beginning of the page was modified, as the details of the modification. The controller 10 may also add, to the third column of the modification history list 121, a modification history 121B including the character string "second page" indicating the modified page, the character string "Deleted: Provisions 2.3-2.7" indicating that the character string 81A was deleted, and the character string "Added: Provisions 3.5-3.6" indicating that the character string 81B was added, as the details of the modification.

In the foregoing embodiment, the controller 10 decides at step S18 whether the modification mode is the "basic version", according to the modification mode stored in the HDD 17. However, the disclosure is not limited to such an arrangement. For example, the controller 10 may decide that the modification mode is the "basic version", when the source image only includes a single page, and that the modification mode is not the "basic version", when the source image is composed of a plurality of pages.

Although the controller 10 decides at step S15 whether the image forming instruction has been received, in the foregoing embodiment, a different arrangement may be adopted in the disclosure. For example, the controller 10 may decide, instead of step S15, whether an instruction to save the electronic file has been received. In this case, the controller 10 stores the modified electronic file in the HDD 17, upon deciding that the instruction to save the file has been received.

Further, although the image forming device 12 is configured to form an image on the recording sheet in the foregoing embodiment, the disclosure is not limited to such a configuration. The image forming device 12 may form an image on a different recording medium, other than the recording sheet. For example, an overhead projector (OHP) sheet may be employed, to form an image.

The disclosure may be modified in various manners, without limitation to the foregoing embodiments. For example, although the color MFP is taken up in the foregoing embodiments as an example of the image processing apparatus according to the disclosure, the disclosure is also applicable to various other image forming apparatuses, such as a monochrome MFP, a copier, and a facsimile machine, or a scanner.

Further, the configurations and processings described in the foregoing embodiments with reference to FIG. 1 to FIG. 12 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
an image reading device that reads a source document and generates image data;
a control device including a processor, and configured to act, when the processor executes a control program, as a controller that generates an editable electronic file from the image data; and
an input device to be used by a user to input an instruction,
wherein, upon receipt, through the input device, of a modification of the source image represented by the electronic file, the controller adds a modification history based on the modification made, to the modified source image,
wherein, in a case where an instruction to add the modification history to a page different from the page constituting the source image is received through the input device, the controller generates a new page for adding the modification history, upon receipt of a modification of the source image through the input device, and adds the modification history based on the modification made, to the new page generated, and
upon receipt of an additional modification of the source image through the input device, the controller adds the modification history reflecting the additional modification, to the modification history included in the new page.

2. An information processing apparatus comprising:
an image reading device that reads a source document and generates image data;

a control device including a processor, and configured to act, when the processor executes a control program, as a controller that generates an editable electronic file from the image data; and an input device to be used by a user to input an instruction, wherein, upon receipt, through the input device, of a modification of the source image represented by the electronic file, the controller adds a modification history based on the modification made, to the modified source image, wherein, upon receipt of a first instruction to add the modification history to the page constituting the source image, the controller generates a predetermined region for adding the modification history to the page constituting the source image, and adds the modification history based on the modification made to the predetermined region generated, and wherein, in a case where a second instruction to add the modification history to a page different from the page constituting the source image is received through the input device, the controller generates a new page for adding the modification history, upon receipt of a modification of the source image through the input device, and adds the modification history based on the modification made, to the new page generated, wherein the controller decides that the first instruction has been received, when the source image only includes a single page, and that the second instruction has been received, when the source image includes a plurality of pages.

* * * * *